April 5, 1960　　F. D. WERNER ET AL　　2,931,227
GAS TEMPERATURE PROBE

Filed July 22, 1957　　　　　　　　　　　　　　　2 Sheets-Sheet 1

INVENTORS
FRANK D. WERNER
ROBERT E. KEPPEL
MARWIN A. BERNARDS
BY *Wade Koonty*
ATTORNEYS
*Arthur R. Parker*
AGENT April 5, 1960     F. D. WERNER ET AL     2,931,227
GAS TEMPERATURE PROBE Filed July 22, 1957     2 Sheets-Sheet 2

INVENTORS
FRANK D. WERNER
ROBERT E. KEPPEL
MARWIN A. BERNARDS
BY
ATTORNEY

Arthur R. Parker
AGENT

United States Patent Office 2,931,227
Patented Apr. 5, 1960

2,931,227

GAS TEMPERATURE PROBE

Frank D. Werner and Robert E. Keppel, Rosemount, Minn., and Marwin A. Bernards, Redondo Beach, Calif., assignors to the United States of America as represented by the Secretary of the Air Force Application July 22, 1957, Serial No. 673,548

5 Claims. (Cl. 73—349)

This invention relates generally to an improved probe for the measurement of gas temperatures during high speed flight of aircraft and missiles and, more particularly, to a probe device incorporating means controlling the velocity of gas flow therethrough during flight conditions.

In the design of high speed aircraft and missiles, it is necessary to utilize some means for the accurate measurement of true stagnation temperatures, especially under high velocity and high altitude conditions. Under these conditions, accurate stagnation temperatures are highly essential in order to obtain an accurate true airspeed as well as for other purposes. The need for such a probe has been found particularly critical at temperatures up to 1500° C. and altitudes up to 150,000 feet, since in these areas the largest errors occur. Moreover, the most difficult region occurs at a speed of Mach No. 5 and an altitude of 150,000 feet. The present invention, then, involves the development of a probe peculiarly adaptable in the measurement of accurate temperatures under critical conditions.

An object of the present invention, therefore, resides in the provision of new and improved means for accurately measuring true stagnation temperatures in the higher altitude regions.

A further object of this invention provides a temperature sensing element for accurate measurement of gas temperatures in the relatively high temperature regions.

A still further object of the invention resides in a gas temperature probe which provides a predetermined amount of air flow therethrough in order to attain more accurate temperature readings.

Another object of the invention utilizes a temperature sensing element surrounded by a plurality of concentrically arranged shields preventing heat transfer therebetween by a means of limiting the flow of gas therethrough to a predetermined velocity.

Other objects and advantages of the invention will become apparent from the following description, taken in connection with the accompanying drawings in which like reference characters refer to like parts in the several figures.

Figure 4:
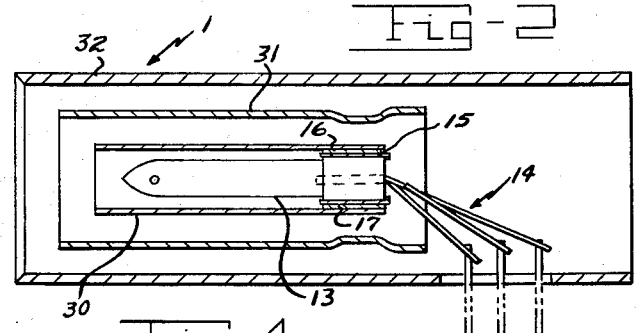
Fig. 4 is a longitudinal sectional view taken about section 4—4 of Fig. 3, illustrating additional details of the second form of temperature sensing element of Fig. 3.
Figure 5:
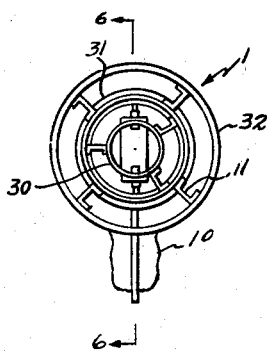
Fig. 5 is another front end view illustrating additional details of the gas temperature probe of Figs. 1 and 2.
Figure 6:
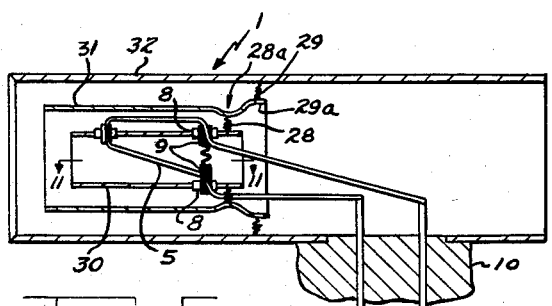
Fig. 6 is a longitudinal sectional view taken about on section 6—6 of Fig. 5, illustrating additional details of the temperature sensing unit of Figs. 1 and 2 and showing individual sonic throats for each of the radiation shields.
Figure 11:
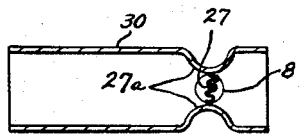

Fig. 11 is a longitudinal sectional view taken about section 11—11 of Fig. 6, showing details of one of the sonic throats utilized in the modifications of Figs. 3 and 4, Figs. 5 and 6, and Figs. 7–9 of the invention.

Figure 10:
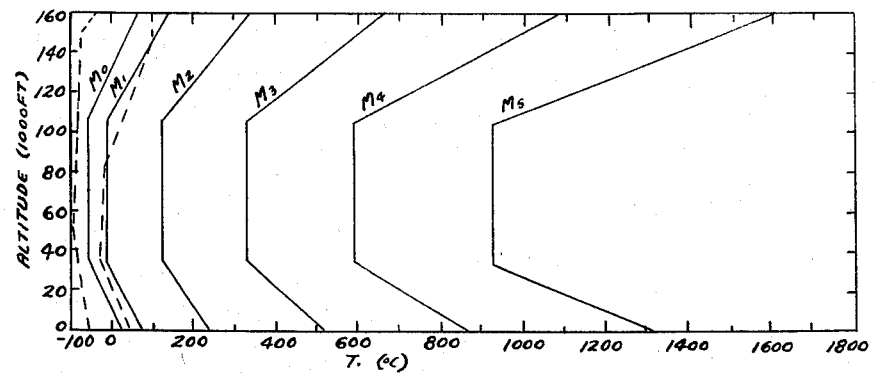
Fig. 10 represents a graph showing the effect of Mach number and altitude on stagnation temperature.

Referring particularly to Fig. 10 of the drawings, a plurality of graphs have been plotted showing the variance of temperatures during flight conditions at various altitudes and Mach numbers. It is clearly seen that for a given Mach number, there is an initial decrease in temperature at altitudes between sea level and just under 40,000 feet, followed by a region of constant temperatures, and ending in a region of increasing temperatures between altitudes of somewhat over 100,000 feet and approximately 150,000 feet. It is apparent that the region of greatest difficulty occurs at a Mach number equal to 5 as represented by the M5 graph and at an altitude of 150,000 feet. The gas temperature probe of the instant invention represents an improved design for effectively measuring accurate stagnation temperatures at these more difficult regions; however, said gas temperature probe is not limited to measurement of stagnation temperatures, but is also readily used for measurement of any gas temperature within its useful range.

Figure 1:
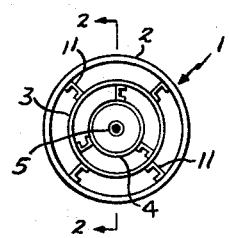
Fig. 1 is a front end view of the gas temperature probe utilized in the invention, illustrating the arrangement of radiation shields in surrounding relation to the temperature sensing element.
Figure 2:
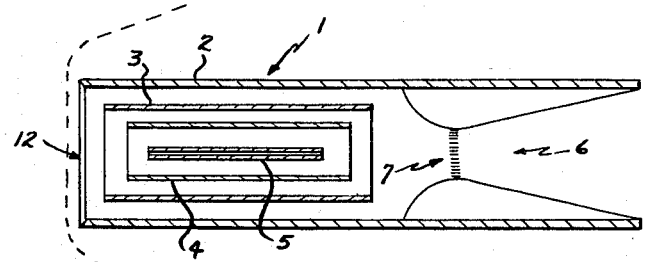
Fig. 2 is a longitudinal sectional view taken about section 2—2 of Fig. 1, schematically illustrating additional details of the temperature sensing element of Fig. 1 with only one sonic throat shown schematically.

With specific reference to Figs. 1 and 2 of the drawings, the gas temperature probe of the present invention is indicated generally at 1 and includes an outer cylinder 2, an intermediate cylinder 3 and an inner cylinder 4. A temperature sensing element 5 is located at the center of said inner cylinder 4. As seen clearly in Fig. 2 of the drawings, said cylinders 2, 3 and 4 which are concentrically arranged with respect to each other, act as radiation shields for a purpose to be explained hereinafter. The temperature sensing element 5 which is schematically illustrated in Fig. 2 as a small central cylinder will be described hereinafter in detail with reference to several forms. It is also seen that the gas temperature probe 1 of Fig. 2 is shown as incorporating a single sonic controlling orifice indicated generally at 6 for the sake of clarity; however, it will be seen that, in a modified form, each of the three cylinders 2, 3 and 4 may have an identical sonic orifice whose object is to be described hereinafter. As previously stated, said cylinders 2, 3 and 4 act as radiation shields for the flow of air or other gas therethrough. In the measurement of stagnation temperatures during high speed aircraft flight, air flows through said gas temperature probe 1 from left to right as viewed in Fig. 2 and at the restricted area or sonic throat indicated generally at 7, said air flow is at sonic velocity whereas upstream or forward of said throat 7, the air flow is at subsonic velocity. With known aerodynamic theory, the subsonic Mach number forward of said throat 7 may be predicted. It is desirable that the temperature of the inner shield 4 be as nearly as possible the same as that of the temperature sensing element 5 in order to minimize radiation heat losses from said junction 5. In order to ensure this desired result, the intermediate and outer radiation shields 3 and 2, respectively, must likewise be as nearly as possible the same temperature. In order to achieve the above desired result of identical or nearly identical temperatures, said three radiation shields 2, 3 and 4 may be modified so that the Mach number or velocity of air flow through each of said shields is controlled in the present invention as by means of individual sonic throats indicated at 27, 28 and 29, respectively, for each of the three cylinders as illustrated, respectively, at 30, 31 and 32 in the modification of Figs. 5, 6 and 11 of the drawings, for example, wherein the temperature sensing element 5 is illustrated in detail as a thermocouple junction. The aforesaid individual sonic throats 27, 28 and 29 are also incorporated within identical radiation shields 30, 31 and 32 utilized with the modifications of Figs. 3 and 4 and Figs. 7–9 of the drawings.

Referring particularly to Figs. 5, 6 and 11 of the drawings, there is illustrated the previously mentioned modified cylinders or radiation shields 30, 31 and 32 with two of the three separate sonic throats schematically shown in Fig. 6 by the wavy lines at 28 and 29. Said two sonic throats 28 and 29 of Fig. 6 which are incorporated on the downstream ends of the intermediate and outer radiation shields 31 and 32, are identical to that shown in Fig. 11 of the drawings, in which figure it is clearly seen that the sonic throat 27 is incorporated in inner shield 30 somewhat upstream from that of intermediate shield 31. The restricted area of inner and intermediate sonic throats 27, 28 is formed by interiorly disposed annular flanges 27a and 28a, respectively, crimped into the circumference of radiation shields 30 and 31. The restricted area of outer sonic throat 29 of outer shield 32 is similarly formed as clearly indicated at 29a in Fig. 6 of the drawings by crimping or bending the downstream or righthand end of intermediate shield 31 outwardly towards the opposite inner wall surface of outer shield 32. This utilization of three separate or individual throats 27, 28, 29 in the modification of Figs. 5, 6 and 11, for example, instead of the one sonic throat 7 illustrated in Fig. 2 constitutes a special and unique feature of the invention whereby individual control over the Mach number between each shield is maintained in order to eliminate or substantially reduce heat transfer therethrough and thereby attain more accurate stagnation temperature readings on the temperature sensing element or thermocouple junction 5. It has been determined that, with the modification of Figs. 5, 6 and 11, Mach numbers of 0.6 within the intermediate and outer shields 31 and 32 and 0.3 within inner shield 30 is indicated with the gas temperature probe 1 of the instant invention. With temperatures ranging as high as 1500° C., said radiation shields 30, 31 and 32 are made of platinum-rhodium alloy, and the thermocouple junction 5 is made of platinum vs. rhodium alloy. As clearly seen in said Fig. 6, the thermocouple wire of said thermocouple junction 5 is mounted on insulators consisting of washer shaped sapphire jewels 8 mounted in the wall of the inner shield 30. In order to prevent said thermocouple wire from contacting said radiation shield 30, a short length of very small platinum or platinum-rhodium tubing 9 is mounted in each of said jewels 8 extending therethrough in overlapping relation at each end thereof of. Said outer cylinder or radiation shield 32 is mounted as shown to the sting or strut type support 10, which in turn is mounted on a plate (not shown) adaptable for attachment to the surface of an airfoil or to the fuselage of an aircraft or missile. The intermediate shield 31 is mounted on said outer shield 32 and the inner shield 30 is mounted on said intermediate shield 31 by means of platinum-rhodium struts 11.

An important feature of the present invention resides in the staggered relation between the upstream or forward ends of the three cylinders or radiation shields 2, 3 and 4 previously described relative to Fig. 2, for example. As seen in the latter Fig. 2, for example, the outer shield 2 is longer than the intermediate shield 3, which in turn is longer than the inner shield 4. The particular relation shown results in a unique and improved temperature sensing element or thermocouple junction 5 since, if the length of the inner shield 4, for example, were increased, the resultant heat transfer from the gas would be reduced in the cylinder or inner shield 4 in the area adjacent to said thermocouple junction 5, and in addition the opportunity for loss of heat by radiation out the left or forward end of the probe 1 would greatly increase. Moreover, if the inner cylinder or shield 4 were relatively long, the chance of the boundary layer filling the interior of said probe 1 would greatly increase, resulting in a loss of heat from the gas or air flow passing over said thermocouple junction 5 by convection to said inner cylinder or shield 4. Thus, the staggered arrangement of the aforesaid cylinders or radiation shields forms an important aspect in all modifications of the gas temperature probe 1 of the instant invention whereby more accurate stagnation temperatures are measured at the temperature sensing element or thermocouple junction 5. Furthermore, the probe inlet 12 is bevelled to insure that the sonic throat 7 of the modification of Figs. 1 and 2 and the sonic throats 27, 28, 29 of the modifications of Figs. 3 and 4, 5, 6 and 11, and 7, 8 and 9 cannot become supersonic under predetermined conditons and thereby lose their effectiveness. Said probe 1 is positioned on the air frame of a missile or aircraft such that it is outside the boundary layer of the air flowing over said air frame and faces upstream. At Mach numbers greater than 0.6 there is sufficient compression of the air to insure sonic flow in said sonic throats.

Figure 3:
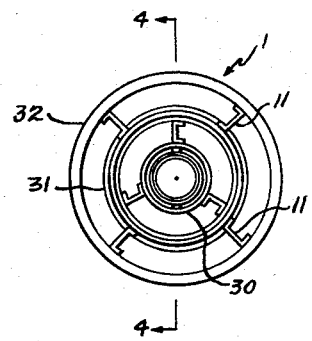
Fig. 3 is a second front end view of the gas temperature probe of Fig. 1, illustrating a second form of temperature sensing element.
Figure 7:
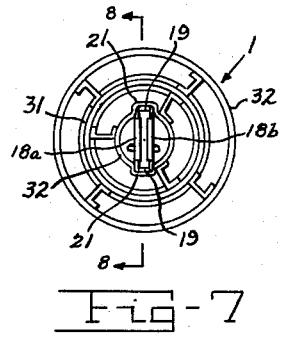
Fig. 7 is a third end view of the gas temperature probe of Fig. 1, illustrating a third form of temperature sensing element.
Figure 8:
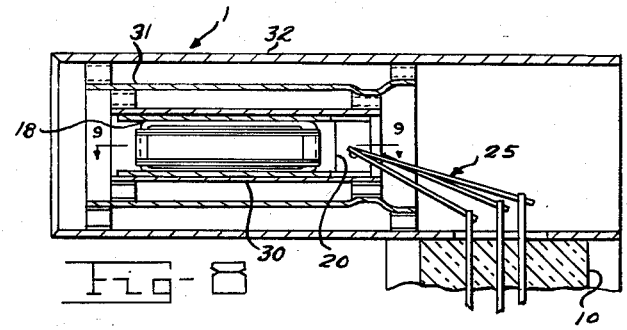
Fig. 8 is a third longitudinal sectional view taken about section 8—8 of Fig. 7, illustrating additional details of the temperature sensing element of Fig. 7.
Figure 9:
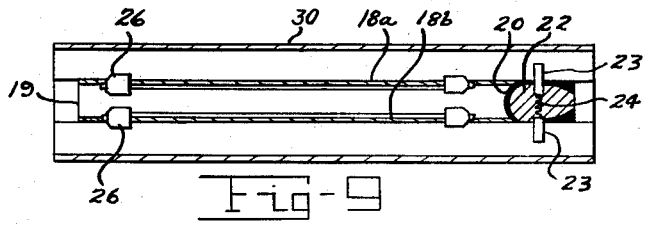
Fig. 9 is another longitudinal sectional view taken about section 9—9 of Fig. 8, showing further details of the temperature sensing element of Fig. 8.

In Figs. 3 and 4 of the drawings, there is illustrated a total or stagnation temperature probe similar in design to that of Figs. 1 and 2 except that a resistance thermometer is utilized as the temperature sensing element and three individual sonic throats 27, 28 and 29 are also utilized as in the case of the previously described modification of Figs. 5, 6 and 11 of the drawings, as well as that illustrated in the modification of Figs. 7, 8 and 9 of the drawings to be described hereinafter. It is noted that since the aforesaid individual sonic throats 27, 28 and 29 are identical for all modifications utilizing the same, they are shown in detail in the modification of Figs. 5, 6 and 11 only and are therefore not repeated for the modifications of Figs. 3 and 4 and Figs. 7, 8 and 9 of the drawings. Said thermometer consists of a mandrel 13 on which is wound 0.002 inch pure platinum resistance wire (Ro is nominally 20 ohms). Said mandrel 13, which is made of either steatite or preferably fused sapphire, has double threads, 160 per inch (approximately 0.0031 inch from groove to groove) which are approximately 60° V threads with a 0.001 inch radius of curvature at the bottom of the thread. The leads 14 are cemented into holes in the downstream end of said mandrel 13. The rear end of said mandrel 13 fits into the platinum-rhodium socket 15 which is welded to the inner shield 30 by means of two platinum-rhodium blocks 16 and 17. With this type of temperature sensing element, greater ruggedness and ease of construction is achieved, as well as a minimum of trouble due to leakage caused by absorbed water.

In Figs. 7–9, inclusive, of the drawings, another form of temperature sensing element is utilized with the otherwise identical gas temperature probe 1 previously described relative to the modifications of Figs. 3 and 4 and Figs. 5, 6 and 11 of the drawings In this form, a platinum "card" type resistance thermometer 18 is utilized. Said resistance thermometer 18 consists of two platinum-rhodium alloy frames or cards 18a and 18b on which is wound 0.002 inch pure platinum resistance wire. Said frames or cards 18a and 18b are welded to two strips 19 and the platinum-rhodium channel 20 to complete the resistance assembly. Said assembly slides into upper and lower grooves 21 in the inner shield 30. Said channel 20 is filled with cement at 22 which anchors the platinum terminals 23 to which the resistance element 24 and lead wires 25 are welded. Insulation for said resistance wire is provided by cement at 26. With the use of the platinum resistance thermometer of Figs. 7-9, the gas temperature probe 1 incorporates radiation shield dimensions approximately 50% larger than those of the thermocouple type probe. In this design, refractory cement is utilized for insulation rather than sapphire jewels.

Thus, a new and unique gas temperature probe has been developed wherein the velocity of air flow in the space between three cylinders or radiation shields 30, 31 and 32 is controlled by means of individual sonic throats 27, 28 and 29 acting as chokes to selectively regulate said flow to predetermined values. Moreover, each of said three cylinders or shields is progressively shorter in length in order that radiation losses out the front end of said probe are reduced and a higher average head transfer to the inner cylinder or shield is permitted. With the arrangement inherent in the probe of the subject invention, accurate total or stagnation temperatures are assured for high speed aircraft, ramjet, turbojet, and other similar aircraft propulsion systems, as well as in numerous industrial applications where accurate measurement of gas temperatures is important.

We claim:

1. Means for measuring accurate ambient temperatures at high altitudes during high speed flight comprising a gas temperature probe having a plurality of spaced concentric open end cylinders adaptable for mounting in staggered relation at the upstream ends thereof on a missile to admit high speed air in the spaces between said cylinders and a temperature sensing element positioned within the inner cylinder of said plurality of cylinders, and restricted choke means mounted on the downstream end of each of said plurality of cylinders comprising sonic throats selectively and individually controlling the velocity of air flowing through said cylinders to a predetermined amount to equalize the temperature of each of said plurality of cylinders and said temperature sensing element.

2. In a gas temperature probe having a temperature sensing element and a plurality of concentrically mounted cylindrical, spaced radiation shields surrounding said sensing element and open at both ends to admit the flow of high velocity air in the spaces between said shields, means preventing heat transfer between said shields and assuring accurate temperatures at said temperature sensing element, said means comprising a restricted sonic throat formed in each shield at the downstream ends thereof independently choking said flow of air to an individual predetermined velocity in each of said shields to substantially eliminate heat transfer therebetween.

3. In a gas temperature probe as in claim 2, said plurality of radiation shields consisting of an outer cylinder, an intermediate cylinder, and an inner cylinder, said inner cylinder being shortened relative to said intermediate cylinder substantially reducing radiation losses out the upstream end of said probe, and said outer cylinder being elongated relative to said intermediate cylinder to substantially eliminate filling of the interior of said tube with boundary layer.

4. In a gas temperature probe as in claim 2, said probe being bevelled at its inlet insuring that the air flow through said sonic throats remains sonic under predetermined conditions.

5. A gas temperature probe adptable for mounting on the end of a short strut, comprising three cylindrical radiation shields concentrically mounted in spaced staggered condition relative to each other adjacent the upstream ends thereof, a temperature sensing element positioned within the inner shield of said three shields, and an internally arranged streamlined projecting member incorporated in the cylindrical spaces formed between said concentric shields adjacent the downstream end thereof, said projecting members consisting of a sonic throat individually formed into each of said shields with at least one thereof upstream relative to the other and independently choking the flow of high speed air admitted to the opposite end of said probe into said spaces to selectively and individually control the velocity of said air flow in each shield minimizing heat transfer between said shields and assuring accurate temperature readings at said temperature sensing element, said temperature sensing element comprising a thermocouple junction having a thermocouple wire mounted within a relatively short tubing positioned within jewels incorporated within the walls of said inner shield.

References Cited in the file of this patent

UNITED STATES PATENTS

| | | |
|---|---|---|
| 1,734,925 | Tovey | Nov. 5, 1929 |

FOREIGN PATENTS

| | | |
|---|---|---|
| 320,194 | Great Britain | Oct. 10, 1929 |
| 868,638 | France | Oct. 13, 1941 |
| 940,261 | France | May 18, 1948 |
| 1,119,939 | France | Apr. 9, 1956 |

OTHER REFERENCES

Article in Transactions of the A.S.M.E., July 1943, col. 65, pp. 421–431. (Copy in Scientific Library, U.S. Patent Office.)